(12) United States Patent
Lakatos (10) Patent No.: US 8,790,108 B2
(45) Date of Patent: Jul. 29, 2014

(54) PRESS PLATE ACTUATING SYSTEM

(76) Inventor: Jorge Lakatos, Sao Paulo (BR)

( * ) Notice: Subject to any disclaimer, the term of this patent is extended or adjusted under 35 U.S.C. 154(b) by 418 days.

(21) Appl. No.: 13/378,563

(22) PCT Filed: Jun. 14, 2010

(86) PCT No.: PCT/BR2010/000197
§ 371 (c)(1),
(2), (4) Date: Dec. 15, 2011

(87) PCT Pub. No.: WO2010/144981
PCT Pub. Date: Dec. 23, 2010

(65) Prior Publication Data
US 2012/0093960 A1    Apr. 19, 2012

(30) Foreign Application Priority Data

Jun. 18, 2009 (BR) .................................. 0902159
Mar. 22, 2010 (BR) .................................. 0902159

(51) Int. Cl.
*B29C 51/22* (2006.01)
(52) U.S. Cl.
USPC ........................... 425/298; 425/398; 425/441
(58) Field of Classification Search
USPC .................................. 425/289, 398, 441–442
See application file for complete search history.

(56) References Cited

U.S. PATENT DOCUMENTS

| 3,324,703 | A | | 6/1967 | Foster et al. |
| 4,023,393 | A | | 5/1977 | Messerschmidt |
| 6,135,756 | A | * | 10/2000 | Arends ........................ 425/398 |
| 6,712,599 | B2 | * | 3/2004 | Schlimgen et al. ........... 425/409 |
| 7,560,063 | B2 | * | 7/2009 | Schlosser et al. ............. 425/289 |

FOREIGN PATENT DOCUMENTS

| BR | PI 0606072-2 | 1/2008 |
| BR | MU 8701613-3 | 2/2008 |
| BR | MU 8701316-9 | 11/2008 |
| BR | PI 0900233-2 | 1/2009 |
| WO | WO 2008/009402 | 1/2008 |

OTHER PUBLICATIONS

International Search Report for PCT/BR2010/000197.
Written Opinion of the International Searching Authority for PCT/BR2010/000197 and English Translation of Substantive Parts.

* cited by examiner

*Primary Examiner* — Joseph S Del Sole
*Assistant Examiner* — Thukhanh Nguyen
(74) *Attorney, Agent, or Firm* — B. Aaron Schulman, Esq.; Stephen J. Weyer, Esq.; Stites & Harbison, PLLC.

(57) ABSTRACT

The present invention is related to a press plate actuating system, particularly for driving a lower thermoforming plate (6, 60) when thermoplastic films are molded into products. The system is comprised of two eccentric axles (1 and 2; 10 and 20), a long and a short one, that promote the vertical movement of the lower plate (6, 60) and the cutting of a thermoplastic film (F).

4 Claims, 7 Drawing Sheets

PRESS PLATE ACTUATING SYSTEM

The present invention refers to a press plate actuating system, particularly for driving a thermoforming plate when thermoplastic films are molded and cut, for example, for producing products.

BACKGROUND OF THE INVENTION

The present invention refers to a press plate actuating system, particularly for thermoforming machines during the production of plastic products such as cups, plates, trays, disposable containers, etc.

Basically such machines comprise a vertical structure provided with a mold that is located on a lower plate that is moved towards another upper plate, fixed or movable, for molding a continuous thermoplastic film. The lower plate pulls the mold downward to allow the thermoformed product to be removed, also to position said film for molding a new product; the lower plate pushes the mold upward towards the upper plate that contains a knife or a counter-knife, as well as eventually towards an auxiliary counter-mold the function of which is to assure that the walls of the thermoformed product are as uniform as possible, forcing the plastic material film to assume the shape of the mold, with the aid of temperature and pressure and/or vacuum.

Thus, when the thermoplastic film is heated, it melts down and conforms to the molds by applying compressed air or vacuum. After the product is molded, the mold itself cuts the product and separates it from the rest of the film.

Also, this downward movement is necessary so that the product may be removed from the mold. The upward and downward movements should be carried out as fast as possible so as to favor high production. Besides the fast upward and downward movements, the plate should be strong enough to support the molding compressed air, as well as to cut the products by detaching them from the plastic film by the end of the upward movement. According to the materials, such as PET (polyethylene terephthalate), the force applied is quite strong.

Thus, besides molding, the plate should provide the cutting of the product through an additional pressure of the lower mold towards the upper plate.

Amongst the several known ways through which the plate is driven, reference is made to that carried out by cams; by cranks (also called toggles) driven by pneumatic, hydraulic cylinders, or servomotors; connecting rods (or eccentric axles) driven by engines or servomotors; direct hydraulic cylinders; and the like.

The disadvantage of the cams and hydraulic cylinders is the speed. In the case of the cams the opening or spacing of the plate of the higher mold is accomplished by means of gravity, what restricts its acceleration to the gravity, that is, not allowing accelerations higher than that of the gravity. In the case of hydraulic cylinders, the speeds are limited, besides presenting a number of accuracy problems when it is stopped.

The pneumatically or hydraulically propelled cranks present problems concerning speed limitations, therefore its acceleration in the beginning of the upward movement is not sinusoidal and occurs in an abrupt way.

As to the connecting rods or eccentric axles, used separately for this application, despite having a higher speed and preventing abrupt falls that occur in the cam system, its cutting power is limited, requiring highly powerful and consequently more expensive driving elements.

In order to solve the inconveniences of the prior art, the present invention refers to a press plate actuating system provided with two eccentric axles of different sizes, wherein the first larger eccentric axle moves upward and downwardly the lower plate, and the second smaller eccentric axle promotes the movement that generates the required force for cutting the already molded product. Thus, each of the eccentric axles may be moved at a high speed, without compromising the machine, its parts, or the molded product.

According to the meaning herein, the reference to the eccentric axles that carries out the longer course movement of the lower plate includes similar devices, such as a connecting rod-crank assembly.

Another object of the present invention is to provide an eccentric axle of a reduced course to carry out the cutting, in order to provide a higher cutting force in relation to the one performed by the eccentric axles of a longer course that only carries out the vertical movement.

Another object is to lift and lower said lower plate in the quickest possible way, and at the end of the upward position the second eccentric axle applies a practically instantaneous abrupt cutting force that is the greatest possible.

Advantageously in relation to the prior art, this system provides the speed achieved by connecting rod systems, without its low cutting force limitation, since the second eccentric axles drives the plate with a force that is inversely proportional to the ratio between its dimension and the dimension of the vertical movement eccentric axle. Also, this constructive disposition allows a reduction in the torque of the gear motor that drives the eccentric axles at this same ratio, making it possible to use of smaller gear motors.

Another advantage of this system is that it makes it possible to execute the cutting force at any portion of the course of the smaller eccentric axles, by choosing its relative position. In this embodiment, the cutting force is much higher than the one of the machines that uses only a connecting rod to drive the plate, where it is only possible to cut the film at the end of the course of the connecting rod. The embodiment of the invention allows adjusting the height of the cutting knife electronically, thus making the servomotor that drives the smaller eccentric axle stop at a position suitable for the cut. In machines with a single connecting rod, cranks (toggles) or cams it is necessary to regulate mechanically the height of the upper plate to set the height of the cut.

Schematic figures of particular embodiments of the invention are presented hereinbelow, whose dimensions and ratios are not necessarily the real ones since the purpose thereof is to didactically present the several aspects of the invention, whose scope of protection is determined only by the scope of the attached claims.

BRIEF DESCRIPTION OF THE DRAWINGS

The invention will be described based on the following accompanying drawings.

DESCRIPTION OF THE ILLUSTRATED CONFIGURATION

The example below is concerned with a particular embodiment of the invention, that is, a press plate actuating system used for thermoforming machines (T1) provided with movable lower plates (6, 60) and an upper plate (7) that can be moved or not, one towards the other in one same direction, for molding a sheet of thermoplastic material (F) pressed between said plates, and provided with a mold facing the upper plate (7). The system is provided with two eccentric axles (1 and 2; 10 and 20) that provide the lower plate (6, 60) with two movements. The first eccentric axle performs a long movement that lifts and lowers the lower plate (6, 60), between a lower position and a higher position or towards an upper plate (7); and the second eccentric axle performs a short impact movement of the lower plate (6, 60) towards the upper plate (7).

Figure 1:
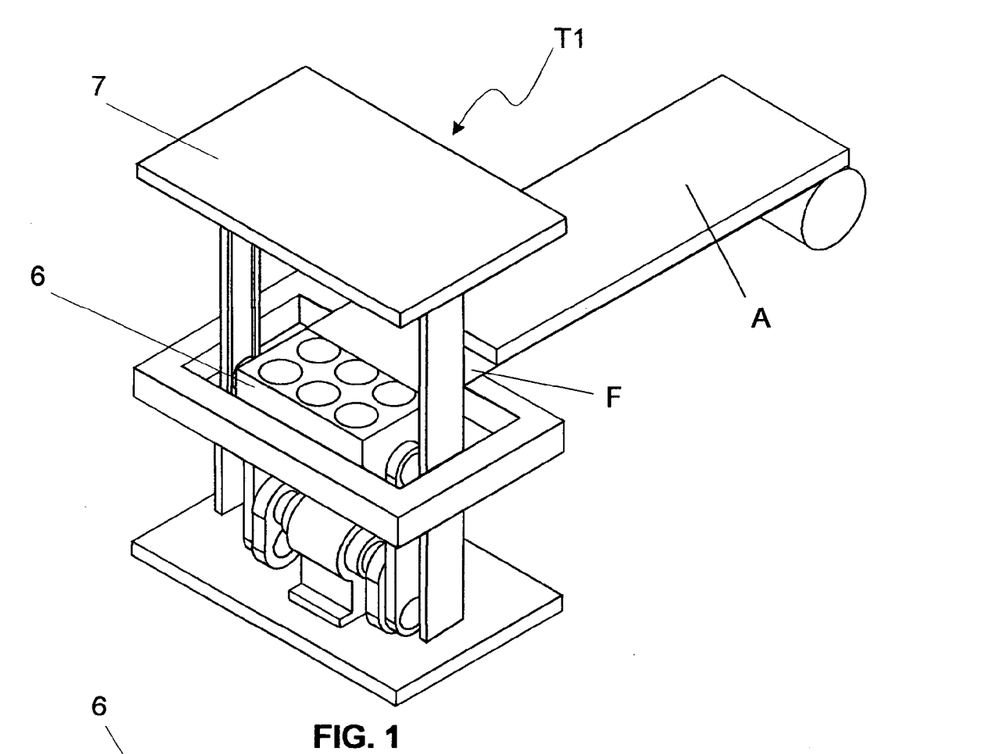
FIG. 1 illustrates a perspective schematic view of an exemplary thermoforming machine (T1) provided with the press plate actuating system of the present invention, and a furnace (a) for heating a film (F)
Figure 2:
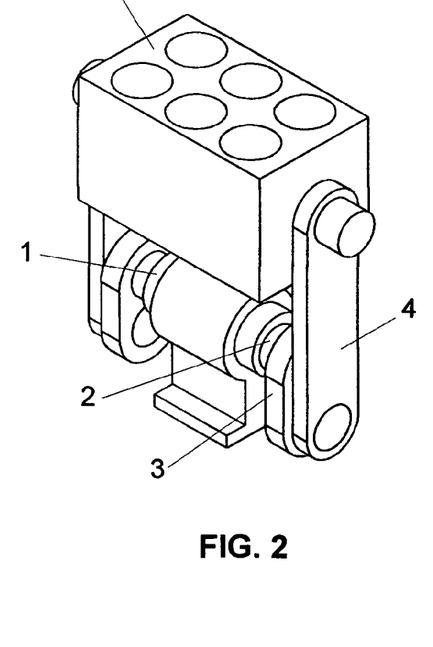
FIG. 2 illustrates a perspective view of the present system for driving a press plate, provided with the connecting rod-crank assembly (3) and arm (4) in its lower position, with the plate (6) below away from the upper plate (7), and the eccentric sleeve (1) in its lower position.
Figure 3:
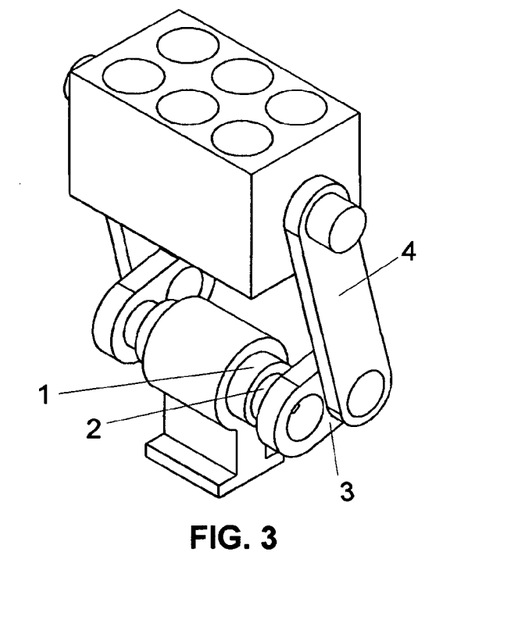
FIG. 3 illustrates a perspective view of the connecting rod-crank assembly (3) and arm (4) rotated by the drive shaft (2), moving the plate (6) into the direction of the upper plate (7), with the eccentric sleeve (1) remaining in its lower position.
Figure 4:
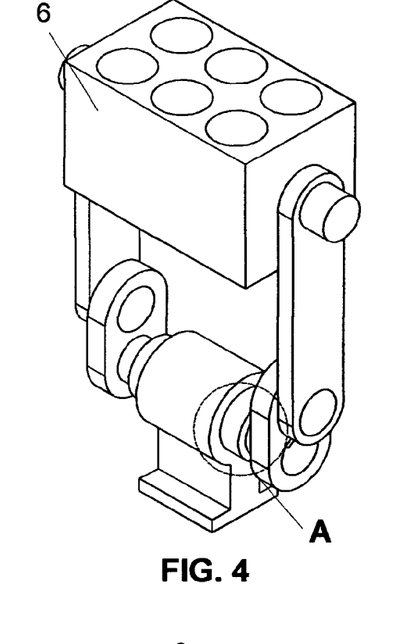
FIG. 4 illustrates a perspective view of the connecting rod-crank assembly (3) and arm (4) directed upward, with the plate (6) in its highest position towards the upper plate (7), with the eccentric sleeve (1) still in its lower position.
Figure 5:
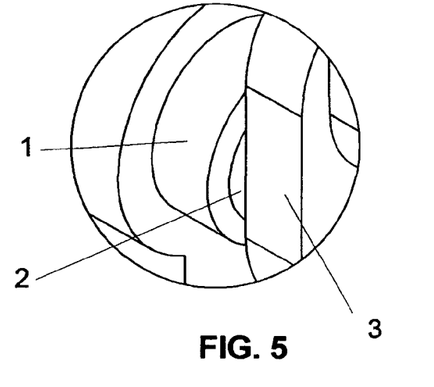
FIG. 5 illustrates an enlarged perspective view of detail A of FIG. 4, when the second eccentric axles starts being driven, where one can observe the eccentricity between the sleeve (1) and the drive shaft (2), with the eccentric sleeve (1) still in its lower position.
Figure 6:
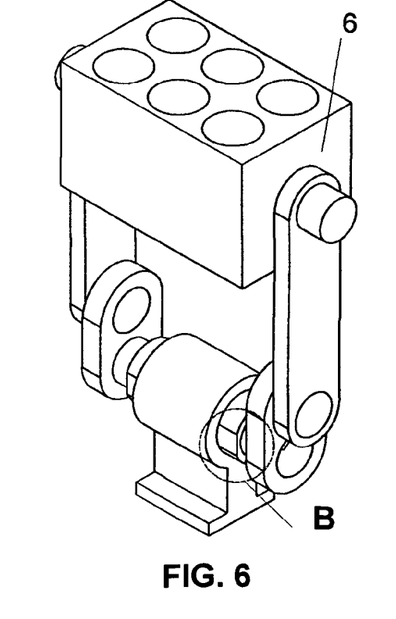
FIG. 6 illustrates a perspective view of the connecting rod-crank assembly (3) and arm (4) on top, with the plate (6) in its highest position and the eccentric sleeve (1) in the middle of its maximum course to effect the pressing to support the molding and cutting.
Figure 7:
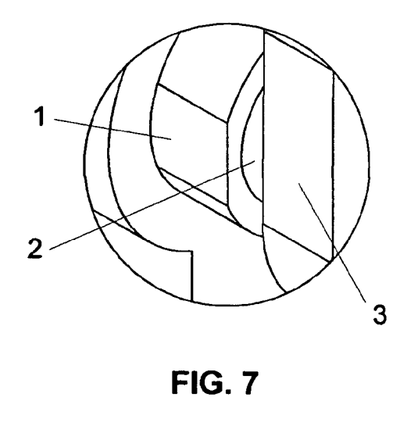
FIG. 7 illustrates an enlarged perspective view of detail B of FIG. 6, where one can observe the eccentricity between the sleeve (1) and the drive shaft (2)
Figure 8:
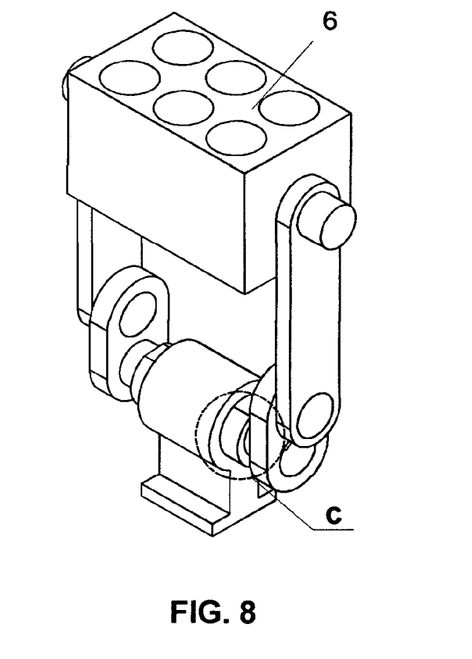
FIG. 8 illustrates a perspective view of the connecting rod-crank assembly (3) and arm (4) with the plate (6) being driven upward by the second eccentric axle, that is, sleeve (1), that is now in its higher position.
Figure 9:
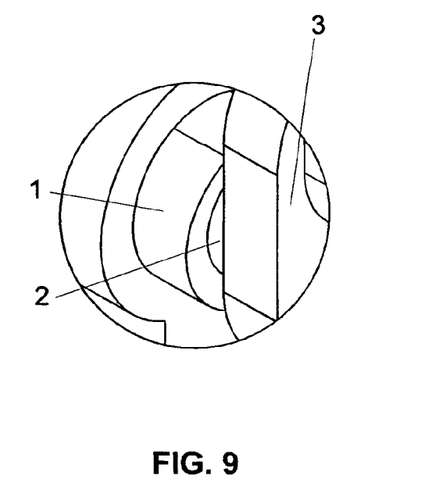
FIG. 9 illustrates an enlarged perspective view of detail C of FIG. 8.

The long movement is provided by the first eccentric axle (2) in the form of a drive shaft (2) connected to a pair of connecting rod-crank assemblies (3) and arm (4), moved when the axle (2) rotates, between a lower position (illustrated in FIG. 2) and a higher position (illustrated in FIGS. 4, 6 and 8).

Thus, the axle (2) drives the pair of connecting rod-crank assemblies (3) and arm (4), that carry along the lower plate (6), with a lower mold (not illustrated), moving away from or towards the upper plate (7) when the thermoplastic films are molded into products (not illustrated).

When the plates (6) and (7) are moved away, the sheet (F) of thermoplastic material for molding the products is moved forward, after passing the furnace (A), and when the plates (6, 7) are pressed towards each other, they retain the sheet (F) between them, thus forming the products under a certain temperature and compressed air.

Figure 10:
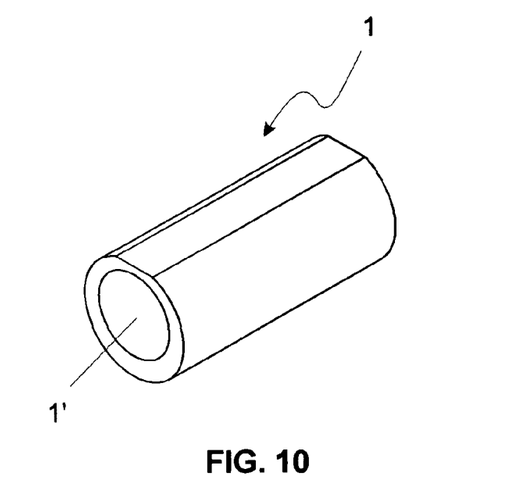
FIG. 10 illustrates an enlarged perspective view of the sleeve (1)
Figure 11:
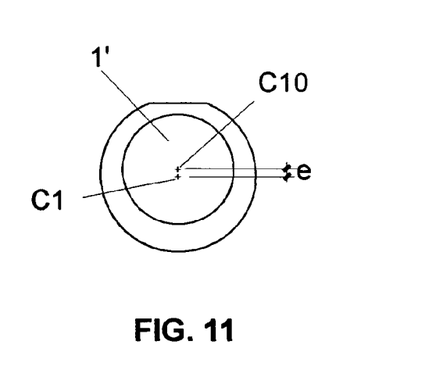
FIG. 11 illustrates a front view of the sleeve (1) with an eccentric hole (1') for positioning the drive shaft (2), wherein (e) is the distance between the geometric centers (C1) and (C10), of the sleeve (1) and the hole (1'), respectively.
Figures 12, 13:
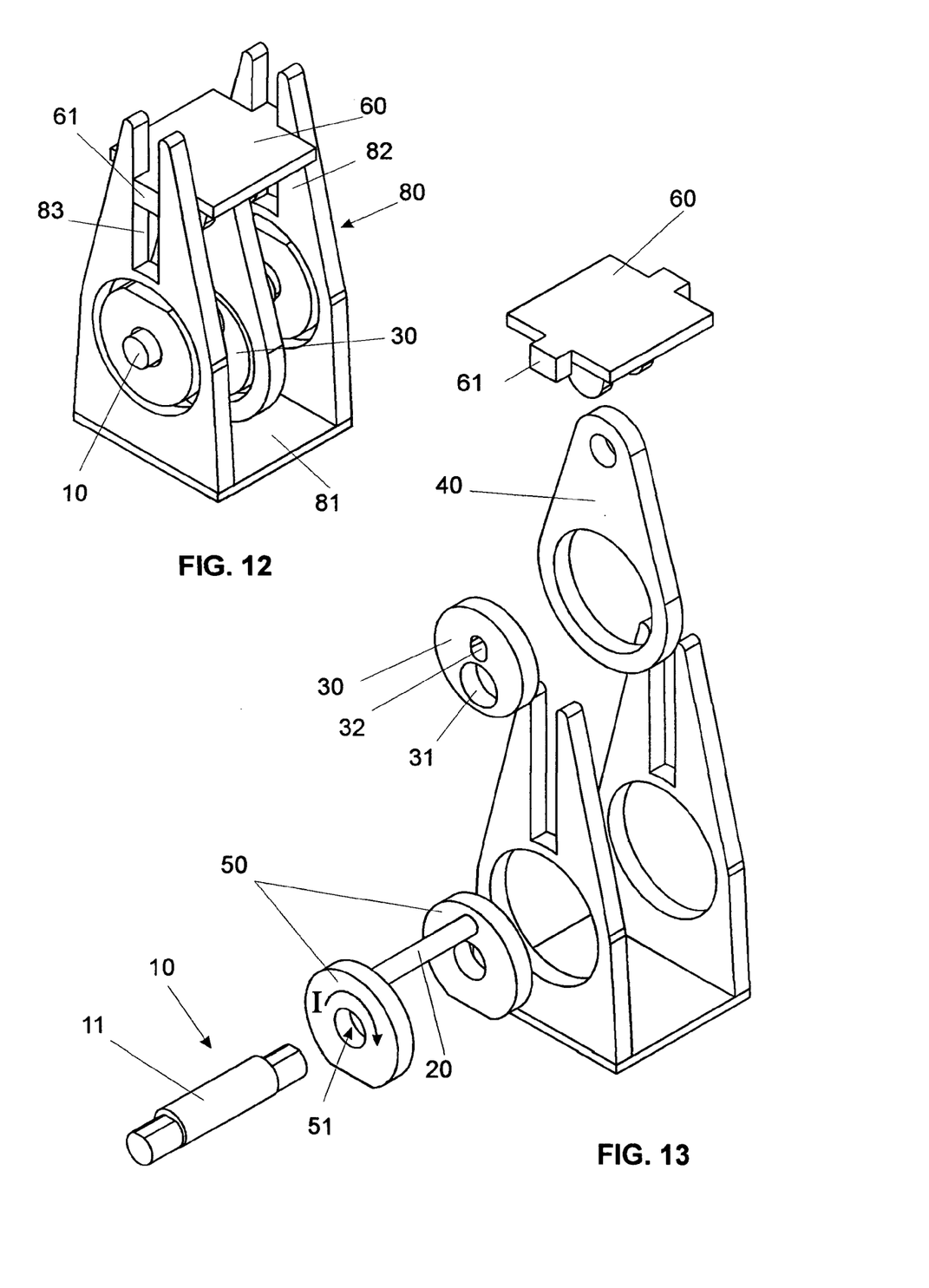
FIG. 12 illustrates a perspective view of a constructive variant of the press plate actuating system with its eccentric axle (10)
FIG. 13 illustrates an exploded perspective view of the constructive variant illustrated in FIG. 12.
Figure 14:
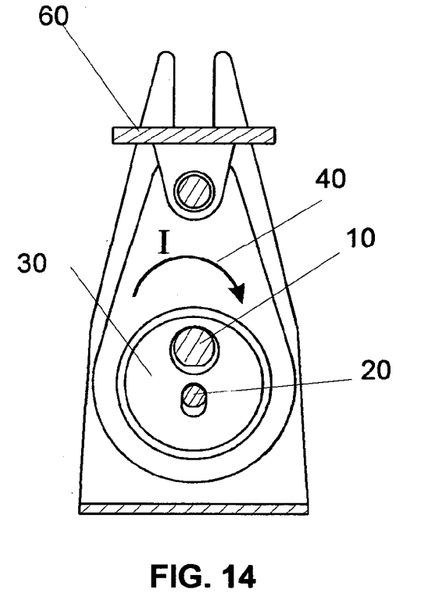
FIG. 14 illustrates a cross-sectional view of the eccentric axle (20) that starts rotating when moved by the dragging disc (50), thus pushing the plate (60) upward.
Figure 15:
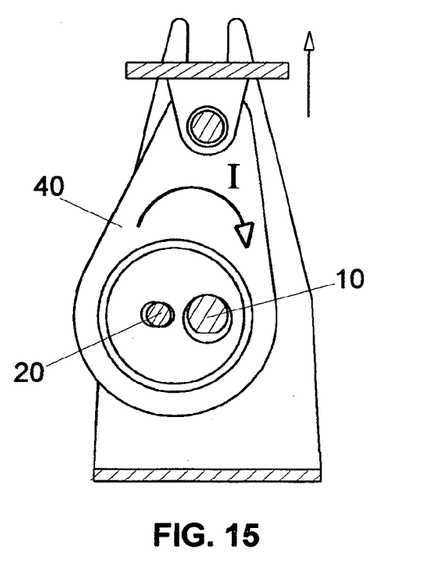
FIG. 15 illustrates a cross-sectional view of the eccentric axle (20) in the middle of its rotation course, with the plate (60) in the middle of its vertical displacement.
Figure 16:
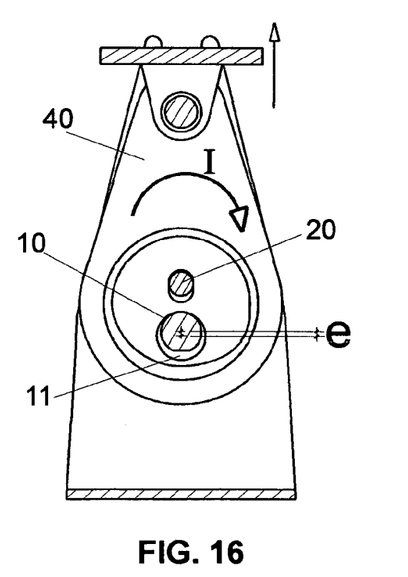
FIG. 16 illustrates a cross-sectional view of the eccentric axle (20) in the end of its rotation course, with the plate (60) in its highest position.
Figure 17:
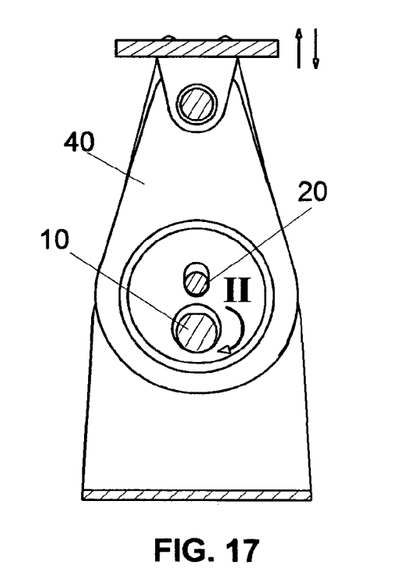
FIG. 17 illustrates a cross-sectional view of the eccentric axles (20) and (10), wherein the eccentric axle (10) is in the middle of its rotation course, with the plate (60) in its impact position on the upper plate.

The present system also comprises a second eccentric axle (1) in the form of a sleeve (1) provided with a longitudinal eccentric hole (1'), wherein the geometric centers (C1) and (C10), of the sleeve (1) and the hole (1'), respectively, are separated by a distance (e). The hole (1') serves as a kind of a cradle for positioning the axle (2) that is eccentric with relation to the sleeve (1). When the sleeve (1) is rotated, this eccentricity (e) stimulates the plate (6) with a force inversely proportional to the ratio between its dimension and the dimension of the vertical movement eccentric axle, thus allowing a reduction in the torque of the reducing means (not illustrated) that drives the eccentric axles at this same ratio.

The rotation movements of the sleeve (1) and the axle (2) are independent, alternating consecutive movements, that is, while the axle (2) turns the sleeve (1) is stopped, and when the sleeve (1) turns, the axle (2) does not move. Thus, according to the illustrated example, while the axle (2) turns the pair of connecting rod-crank assemblies (3) and arm (4), thus lifting or moving away the plate (6), the sleeve (1) is kept static. When the plate (6) reaches its higher position, the rotation of the axle (2) is stopped and the rotation of the sleeve (1) is allowed, and its rotation provides a fast accelerated movement on the plate (6), so that the film (F) is cut between the lower and upper molds.

In other words, the sleeve (1) turns, thus carrying along the axle (2) that, in view of the eccentricity (e), is moved up and down at the rotation speed of the sleeve (1), in a fast impacting movement like a bump, pushing the plate (6) towards the upper plate (7), thus providing the cutting of the film (F) around the already molded product.

Thus, the present press plate actuating system provides the plate (6) with two movements, a first longer course movement for lifting and lowering the plate (6), and a second shorter fast course movement that promotes an impact of the lower plate (6) towards the upper plate (7). The course of the first movement is limited to twice the length of the connecting rod-crank (3), while the course of the second movement is limited to twice the eccentricity (e). Thus, the torque that drives the sleeve (1) can very be small, depending only on the ratio between the course of the plate (6) provided by the two eccentric axles.

The driving of the sleeve (1) and the shaft (2) is any one suited to the installation site and can be carried out, for example, by one or two servomotors (not illustrated).

In the particular situation where only a servomotor is used, it is coupled to the axle (2) or coupled to the sleeve (1), thus alternating its movements.

In a constructive variant, as illustrated in FIGS. 12 to 17, there are two axles (10 and 20) that perform the two eccentric movements that move the lower plate (60). The first eccentric axle (20) performs a long movement for lifting and lowering the lower plate (60), between a lower position and a higher position. The second eccentric axle (10) performs a short impact movement of the lower plate (60) towards said upper plate.

The system comprises a support structure (80) provided with a base (81), a pair of opposite walls (82) with vertical splits (83) from its higher portion that serve as guides for side shoulders (61) of the plate (60). The splits (83) limit the movement of the plate (60) to the vertical position, preventing it from making horizontal movements.

The plate (60) is moved vertically by a connecting rod (40) connected to the bottom face of the plate (60). Said connecting rod (40) is provided with an eccentric disc (30) that comprises two eccentric openings (31) and (32) which are crossed by eccentric axles (10) and (20), respectively, in such a way that when the eccentric axles (10) and (20) are turned alternately, they provide the rotation of the eccentric disc (30) that, in turn, moves the connecting rod (40), lifting or lowering the plate (60).

The long movement of the connecting rod (40) is provided by the first eccentric axle (20) that crosses the opening (32) eccentric with relation to the disc (30), so that the ends of the eccentric axles (20) are connected eccentrically to a pair of dragging discs (50) located on the walls (82) below the splits (83). Thus, when the dragging discs (50) are rotated, the eccentric axle (20) follows its movement (as indicated by arrow I, in FIGS. 13 to 16), forcing the rotation of the eccentric disc (30) that moves the connecting rod (40), providing the vertical movement of the plate (60) between a lower position (illustrated in FIG. 14) and a higher position (illustrated in FIG. 16).

The short impact movement of the plate (60) is provided by the eccentric axle (10) that projects outward from the openings (51) of the discs (50), without being connected thereto, so that it is not dragged by the discs (50) when they rotate. The eccentric axle (10) comprises a non-axial central thickening (11) that goes across the opening (31) of the eccentric disc (30). When the eccentric axle (10) is rotated by its extremity (as indicated by arrow II, in FIG. 17), the disc (30) is moved due to the eccentricity (e) between the thickening (11) and the extremity of the eccentric axle (10) that, by not being axial to the eccentric axle (10), provides a movement in the disc (30) as short as twice the eccentricity (e) between the thickening (11) and the eccentric axle (10), thus propelling the plate (60) with a force inversely proportional to the ratio between its dimension and the dimension of the vertical movement eccentric axles.

In an advantageous way in relation to the prior art, the eccentric axles (1 or 10) perform a cutting force on the plate (60), mold and film assembly that is independent from the position of the plate (6 or 60). The eccentric axles (10) provides the required force for cutting the film (F) already molded into products (not illustrated) irrespective of the position of its course.

In other systems, it is necessary to set the height of the cut by means of spindles or nuts, since there is only one position where the driving is strong enough for cutting.

Since the eccentric axles (1 or 10) of a short course is strong enough to cut at any point along its course, there is an additional practical relevant advantage that the adjustment of the height of cut can be made electronically, thus stopping the eccentric axles (1 or 10) wherever desired within its course. Thus, the machine can have the cutting height inserted into its memory of molds, thus preventing the laborious mechanical regulation every time the molds are changed.

The movements of rotation of the dragging disc (50) that carries an eccentric axle (20), and that of the eccentric axle (10) are independent, alternating and consecutive, that is, while the dragging disc (50) rotates and carries along the eccentric axle (20), the eccentric axle (10) does not rotate, only the movement of the disc (30) takes place. After the rotation course of the discs (50) is finished, its movement is momentarily interrupted, so that the eccentric axle (10) can rotate.

Thus, while the eccentric axle (20) rotates the connecting rod (40), lifting or lowering the plate (60), the eccentric axle (10) does not rotate. When the plate (60) reaches its higher position, the rotation of the discs (50) is stopped and the rotation of the eccentric axle (10) is started, whose rotation provides a fast accelerated movement on the plate (60), so that the film (F) is cut between the lower and upper plates (60).

The driving of the discs (50) and the eccentric axle (10) is any one suited to the installation site than can be carried out, for example, by two engines (not illustrated).

Figure 18:
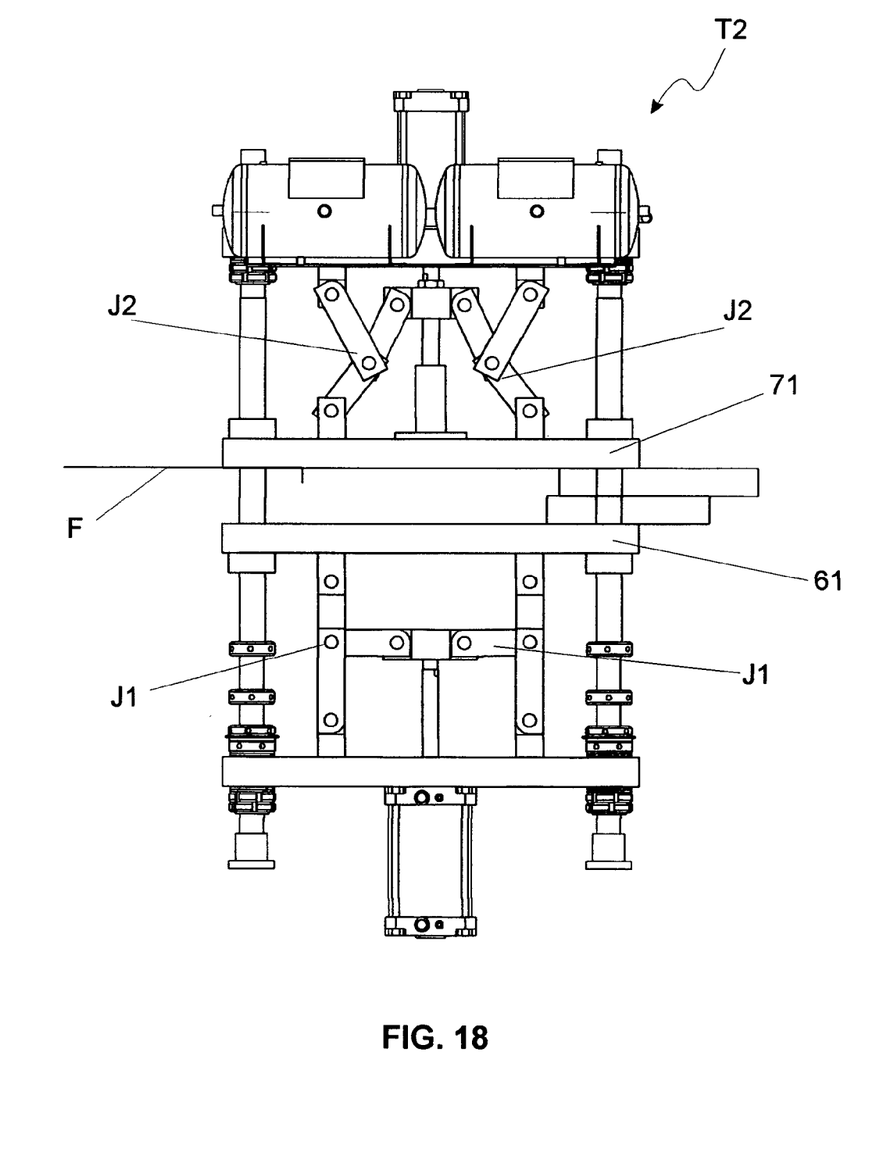
FIG. 18 illustrates a front view of a thermoforming press (T2) of the prior art; and, FIG. 19 illustrates another thermoforming press (T3) of the prior art.

FIG. 18 illustrates a thermoforming press (T2) of the prior art whose lower plate (61) is moved by a pair of cranks (J1) driven by a hydraulic or pneumatic cylinder (H), while the upper plate (71) is moved by another pair of cranks (J2). By considering only the upward and downward movements, this system is suitable, but in order to initiate the upward movement it does not provide an initial speed, since the cranks are located in a way that a great mechanical resistance is provided in the lowered position of the plate (61).

Figure 19:
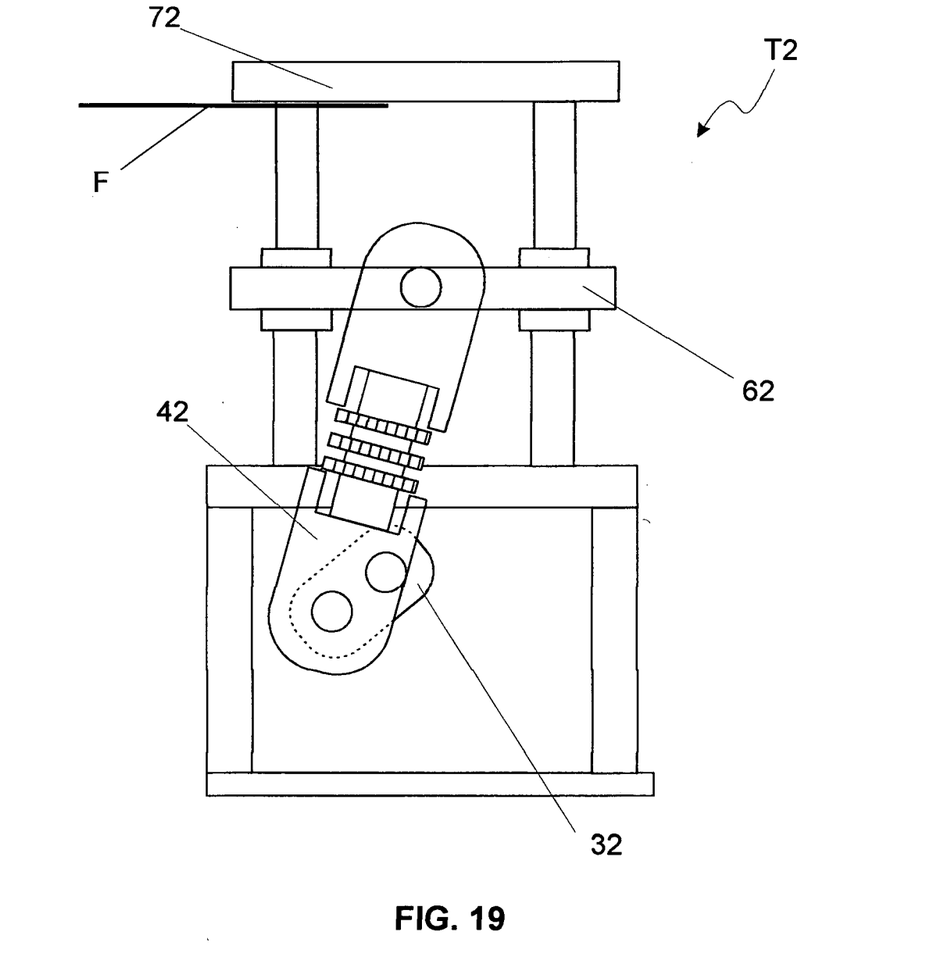

FIG. 19 illustrates another thermoforming press (T3) of the prior art, disclosed in document MU8701316-9, that uses a connecting rod-crank assembly (32) and arm (42) to move the lower plate (62) towards an upper plate (72) that, as can be seen, can offer a highly fast movement, but does not comprise a suitable system for cutting the sheet (F) and therefore requires a great power of the reducing gear that drives same. So, the longer the course of the plate the more force is required.

A person skilled in the art will readily realize, from the description and of the drawings shown, several ways to carry out the invention without departing from the scope of the attached claims.

The invention claimed is:

1. A press plate actuating system of thermoforming presses provided with a movable lower plate (6, 60), an upper plate (7) and a mold facing the upper plate (7), for molding a sheet of thermoplastic material (F) pressed between said plates, said press plate actuating system comprising:

two eccentric axles (1 and 2; or 10 and 20) driven in an independently and alternately way, the first eccentric axle (2, 20) having a long course for lifting and lowering the lower plate (6, 60) between a lower position and a higher position or towards the upper plate (7); and the second eccentric axle (1, 10) having a short course movement and a great impact force of the lower plate (6, 60) against the upper plate (7)

wherein the plate (60) is moved vertically by a connecting rod (40), connected to the bottom face of the plate (60), the connecting rod (40) being provided with an eccentric disc (30) that comprises two eccentric openings (31) and (32) crossed by the eccentric axles (10) and (20), respectively; each of the extremity of the eccentric axle (20) is eccentrically connected to dragging discs (50), the discs (50) being located on opposite walls (82) of a support structure (80); the eccentric axle (10) is positioned freely in an opening (51) centered in the dragging discs (50), and comprises a non-axial central thickening (11) that fits into the opening (31) of the disc (30); wherein the rotation movements of the dragging discs (50) and the eccentric axle (10) are alternating and consecutive.

2. A press plate actuating system of thermoforming presses provided with a movable lower plate (6, 60), an upper plate (7), and a mold facing the upper plate (7), for molding a sheet of thermoplastic material (F) pressed between said plates, said system comprising:

two eccentric axles (1 and 2; or 10 and 20) driven in an independently and alternately way, the first eccentric axle (2, 20) having a long course for lifting and lowering the lower plate (6, 60) between a lower position and a higher position or towards the upper plate (7); and the second eccentric axle (1, 10) having a short course movement and a great impact force of the lower plate (6, 60) against the upper plate (7)

wherein the first eccentric axle (2) is in the form of a drive shaft (2) connected to a pair of connecting rod-crank assemblies (3) and arm (4), moved by the rotation of the axle (2) between a lower position and a higher position; and wherein the second eccentric axle (1) is operatively connected to the crank assemblies (3) and arm (4).

3. The press plate actuating system according to claim 2 characterized in that the second eccentric axle (1) is in the form of a sleeve (1) provided with an eccentric hole (1') whose geometric centers (C1) and (C10), of the sleeve (1) and the hole (1'), respectively, are separated by a distance (e); the hole (1') is a kind of a cradle for positioning the drive shaft (2) that is eccentric to the sleeve (1).

4. The press plate actuating system according to claim 1 characterized in that the discs (50) and the eccentric axle (10) are driven by two engines.

* * * * *